United States Patent [19]
Hibi et al.

[11] Patent Number: 6,127,001
[45] Date of Patent: Oct. 3, 2000

[54] RECYCLABLE COLD CURING AQUEOUS COATING COMPOSITION AND METHOD FOR RECYCLING IT

[75] Inventors: Susumu Hibi, Suita; Masahiro Yamauchi, Osaka; Junichi Sueyoshi, Kyoto-fu, all of Japan

[73] Assignee: Nippon Paint Co., Ltd., Osaka-fu, Japan

[21] Appl. No.: 09/071,953

[22] Filed: May 5, 1998

[30] Foreign Application Priority Data

May 13, 1997 [JP] Japan .................................. 9-122335

[51] Int. Cl.⁷ ...................................................... B05D 1/02
[52] U.S. Cl. ........................... 427/435; 210/650; 210/651
[58] Field of Search ........................... 523/406; 427/345; 210/638, 650, 651

[56] References Cited

U.S. PATENT DOCUMENTS

| | | | |
|---|---|---|---|
| 4,096,061 | 6/1978 | Brennan | 210/45 |
| 4,151,131 | 4/1979 | Sekmakas et al. | 523/412 |
| 4,222,912 | 9/1980 | Sekmakas et al. | 260/23 |
| 4,458,040 | 7/1984 | Suzuki et al. | 523/412 |
| 4,970,135 | 11/1990 | Kushi et al. | 430/280 |

FOREIGN PATENT DOCUMENTS

| | | |
|---|---|---|
| 2079693 | 4/1993 | Canada . |
| 34 28 300 | 2/1986 | Germany . |
| 2 054 613 | 2/1981 | United Kingdom . |

*Primary Examiner*—Robert Dawson
*Assistant Examiner*—D. Aylward
*Attorney, Agent, or Firm*—Wenderoth, Lind & Ponack, L.L.P.

[57] ABSTRACT

The present invention provide a recyclable cold curing aqueous coating composition comprising an acrylic group-modified epoxidized ester resin with acid vale of 25 to 60, which is formed from an epoxy resin (a), a fatty acid (b) and an ethylenically unsaturated monomer (c) in a component (a)/component (b)/component (c) weigh % ratio of 20 to 70/20 to 50/3 to 50, the sum of (a), (b) and (c) being 100 weight %, and a method for reusing it. For the method of the present invention, the coating composition has improved recycling properties by optimizing the properties such as acid value of the resin, the pH of a collecting solution for use to collect the coating composition and a content of a hydrophilic solvent in the collecting solution.

7 Claims, 2 Drawing Sheets under this patent publication number 6,127,001

RECYCLABLE COLD CURING AQUEOUS COATING COMPOSITION AND METHOD FOR RECYCLING IT

BACKGROUND OF THE INVENTION

1. Field of the Invention

The present invention relates to a method for recycling an excess of a recyclable cold curing aqueous coating composition after applying on a substrate. Particularly, the present invention relates to a method for recycling said coating composition which may be collected with a collecting solution in a coating booth and then filtered, concentrated and separated into a concentrated coating solution and a separated solution, and consequently recycled after readjusting them, respectively.

2. Description of Related Art

Aqueous coating compositions having corrosion resistance are typically used as a primer for parts of an automobile, industrial machines, agricultural machinery and the like. When the aqueous coating compositions are applied on a workpiece which has poor heat resistance or has high heat capacity, it has to be dried and cured at a temperature of below 80° C. They are generally called as cold curing aqueous coating compositions.

When the cold curing aqueous coating compositions are applied by spray coating in a coating booth, much amount of paint dust which is not deposited on a substrate is present. The spray dust is dissolved and dispersed into a booth aqueous solution in the coating booth to be collected. The amount of the collected dust is very large, and it is very difficult to dispose of waste paint in view of environmental pollution.

Many efforts to recycle the paint dust collected in the booth aqueous solution have been made, and for example a recycle method is proposed in Japanese Patent Kokai Publication Sho. 49(1974)-51324. The Japanese Publication discloses that sprayed dust of aqueous coating composition is collected by booth aqueous solution to obtain a diluted solution of the coating composition obtained diluted solution is filtered though a reverse osmosis membrane or ultrafiltration membrane to collect and concentrate the spray dust. Then, the concentrated coating composition is adjusted to as high as the non-volatile content of the original components in aqueous coating composition and subjected to reapplication. The "non-volatile" in this context are non-volatile components component including film-forming aqueous resin (such as an aqueous alkyd resin and an aqueous acrylic resin), pigments and the like.

The method described in the Publication, however, has a problem that when the diluted dust solution collected by the booth aqueous solution is filtered and concentrated by ultrafiltration, an aqueous solution separated from the diluted dust solution by filtering is produced in a very large amount. The collected coating composition can be reused, but the separated aqueous solution should be discarded. Therefore, it is also proposed that the separated aqueous solution is returned into the coating booth and recycled as booth aqueous solution.

However, the concentrated coating composition and the aqueous solution separated from the diluted aqueous solution have many disadvantages when repeatedly recycled. For example, in the concentrated coating composition, the concentration of volatile components reduces and the amount of neutralized amine also reduces, and therefore, the pH of the coating composition gradually decreases. In the separated aqueous solution, the concentration of low molecular component separated from the coating solution, for example, a residual monomer and a by-product which are contained in a main binder of the coating composition, or decomposed product generated from the resin during neutralizing and storing the resinous varnish, increases in every recycling use. If the above concentrated coating composition and the aqueous solution continue to be recycled, the hydration stability of the resin against the change in both solvent composition, and pH, which influences recycling characteristics, decreases, and at last the coating composition may aggregate or separate because of the decrease of the stability for of the resin contained in the coating composition.

In order to solve the above disadvantages, it is proposed that the hydrophilic property of the resin contained in the original aqueous coating composition increases so as to enhance the hydration stability before hydration of the resin in recycle use. On applying the above method, however, the coating composition may show defects in film performance, such as salt spray resistance, water resistance and the like. The cold curing coating compositions having corrosion resistance have been known, but there has been no cold curing coating composition which overcomes the above disadvantages and has a recycling property. In addition, according to the above method, the advantages which occur in recycling the aqueous solution after being filtered and separated as a booth aqueous solution are not improved.

SUMMARY OF THE INVENTION

Thus, the main object of the present invention is to provide a method for recycling a cold curing aqueous coating composition having corrosion resistance which improves the efficiency of filtration and concentration of a diluted aqueous solution separated from a diluted dust of a coating composition, without separating and aggregating the resin and pigments contained in the composition. Another object of the present invention is also to provide a method for recycling both the coating composition and a collecting solution, by optimizing the acid value of the film-forming resin contained in the coating composition.

That is, the present invention provides a recyclable cold curing aqueous coating compositions comprising an acrylic group-modified epoxidized ester resin with acid value of 25 to 60, which is formed from an epoxy resin (a), a fatty acid (b) and an ethylenically unsaturated monomer (c) in a component (a)/component (b)/component (c) weight % ratio of 20 to 70/20 to 50/3 to 50, the sum of (a), (b) and (c) being 100 weight %.

The present invention further provides a method for recycling a recyclable cold curing aqueous coating composition, which comprises the following steps:

i) collecting the recyclable cold curing aqueous coating composition described above after applying in a coating booth, using a collecting solution having a pH of 8 to 10, ii) filtering the collected coating composition to separate into a concentrated coating composition and a filtrate, iii) adjusting a concentration of a hydrophilic solvent in the filtrate to 1.5 to 20% by weight and a pH of the filtrate to between 8 and 10, and iv) using the adjusted filtrate as the collecting solution.

In the step ii) of the method of the present invention, a process for filtering and concentrating may be conducted by an apparatus of ultrafiltration. Thus, in the method of the present invention, the coating composition after applying by spray coating method can be collected with a collecting solution, and the collected coating composition can be filtered and concentrate by using ultrafiltration unit (or membrane) to separate to a concentrated coating composition and a filtrate. The concentrated coating composition may be repeatedly reused while restricting the acid value of the resin contained in the composition, i.e. restricting a hydrophilic property of the resin. On the other hand, the filtrate may be recycled as a collecting solution after adjusting a pH and a content of hydrophilic solvent components.

Further, in the method of the present invention, the acid value of the resin in the composition may be selected depending on the pH of the collecting solution or a content of a hydrophilic solvent in the collecting solution.

The method of the present invention, therefore, provides that the improved efficiency of the process for filtering and concentrating in order to recycle a cold curing aqueous coating composition can be achieved without deteriorating the coating characteristics of the coating composition, such as salt spray resistance and water resistance and the like.

BRIEF DESCRIPTION OF THE DRAWINGS

These and other objects and features of the aqueous coating composition and the method for recycling it according to the present invention will become apparent from the following description taken in conjugation with the preferred embodiment thereof with reference to the accompanying drawing, in which.

DEFINITION OF THE TERMS

Figure 1:
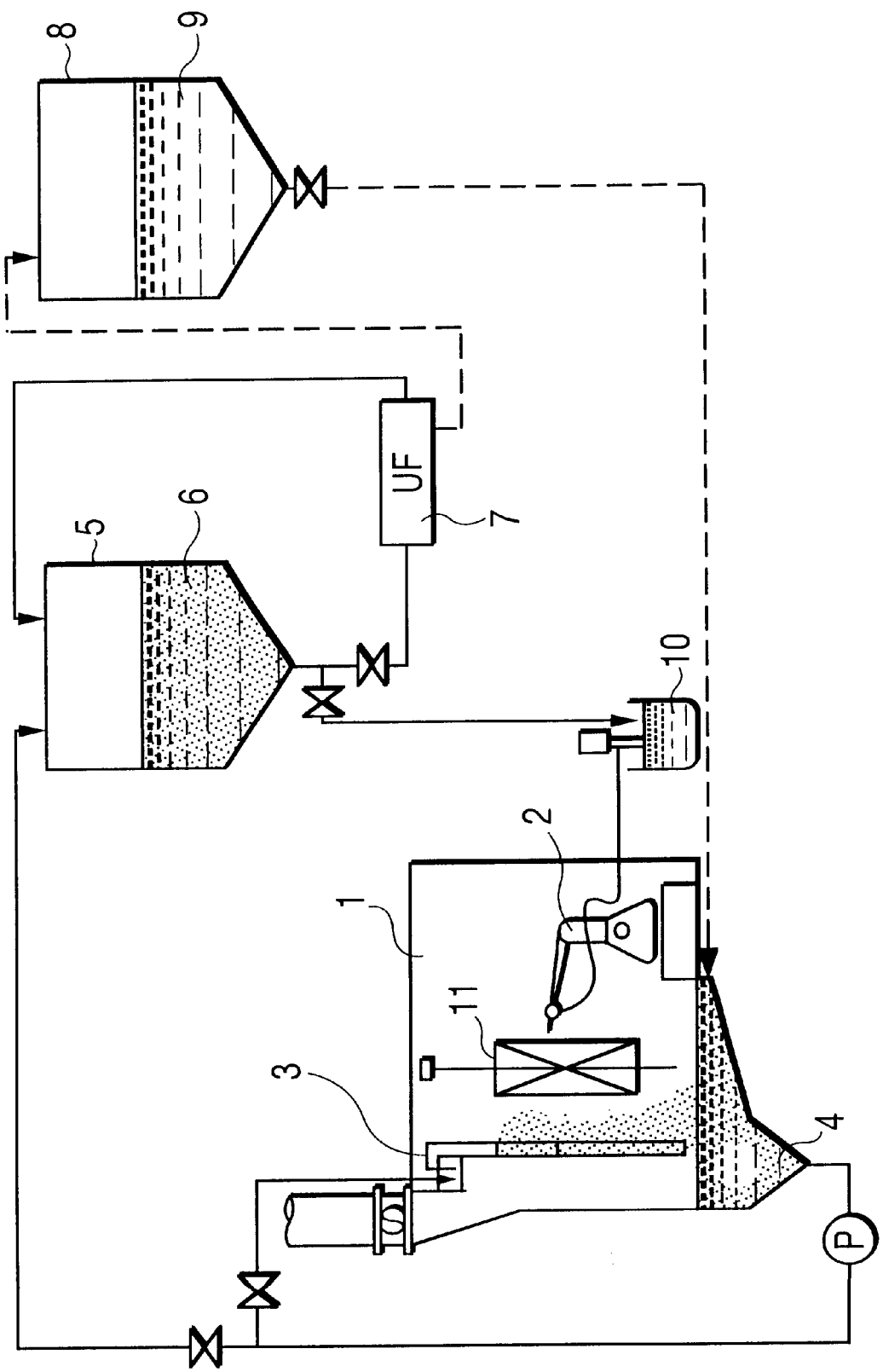
FIG. 1 shows a schematic cross sectional view which illustrates a recycle system for the recyclable cold curing aqueous coating composition according to the present invention.

The terms used herein will be briefly explained by reference to FIG. 1 and FIG. 2. The term "collecting solution (4)" means a solution which can solve and collect the coating composition (2), and it is typically used in the form of a solution curtain (3). The term "diluted solution (9)" refers to a solution containing the coating composition (2) collected with the collecting solution (4). The term "filtrate (20)" means a solution filtered through an ultrafiltration membrane (71), located within an ultrafiltration unit (7) etc. The term "concentrated coating composition (6)" means a recyclable coating composition filtered and concentrated by the ultrafiltration membrane (71).

DETAILED DESCRIPTION OF THE INVENTION

The composition and the method according to the present invention will be explained in detail, hereinafter.

A suitable cold curing aqueous coating composition for use in the method of the present invention is composed of an acrylic group-modified epoxidized ester resin as a main binder, and the other additives. The composition contains solvents, such as a mixture of water and hydrophilic solvent.

The acrylic group-modified epoxidized ester resin can be produced from an epoxy resin (a), a fatty acid (b) and an ethylenically unsaturated monomer (c). An epoxidized ester resin is synthesized from the epoxy resin (a) and the fatty acid (b). The epoxidized ester resin is then modified with the ethylenically unsaturated monomer (c). In view of easiness of acrylic group-modification, the resin preferably comprises styrene monomer in the step of acrylic group-modification.

The epoxy resin (a) is commercially available and includes such as EPIKOTE 828, EPIKOTE 1001, EPIKOTE 1002, EPIKOTE 1004, EPIKOTE 1007 and EPIKOTE 1009 (all of which are bisphenol A type epoxy resin, manufactured by SHELL CHEMICAL Co.), and EPOTOHTO YD-128, EPOTOHTO YD-011, EPOTOHTO YD-012, EPOTOHTO YD-014, EPOTOHTO YD-017 and EPOTOHTO YD-019 (all of which are bisphenol A type epoxy resin, manufactured by TOHTO KASEI Co., LTD.), which may be used one or not less than two in combination simultaneously.

The fatty acid (b) can be natural or synthetic. Examples of the fatty acid (b) are those which are obtained from tung oil, linseed oil, castor oil, dehydrated castor oil, safflower oil, tall oil, soybean oil or palm oil. The fatty acids may be used alone or in combination.

The synthesis of an epoxidized ester resin from the epoxy resin (a) and the fatty acid (b) can be conducted in the conventional method known in the art. For example, an epoxidized ester resin can be obtained by reacting an epoxy resin (a) with a fatty acids (b) in the presence of a suitable condensation catalyst in a suitable solvent (e.g. toluene, xylene and the like) at a temperature of 150 to 250° C. under an atmosphere of a suitable inert gas such as nitrogen gas etc., until a desired acid value is obtained. The condensation catalyst includes dibutyltin oxide, tetra-n-butylammonium bromide and the like.

The acrylic group-modified epoxidized ester resin can be obtain by reacting the epoxidized ester resin with the ethylenically unsaturated monomer (c). Examples of the suitable ethylenically unsaturated monomers (c) are styrene; unsaturated carboxylic acid such as (meth) acrylic acid, maleic anhydride and itaconic acid and the like; (meth) acrylic esters, and the mixture thereof. As the ethylenically unsaturated monomer (c), one or more than two of the acrylic monomers which essentially has at least one carboxyl group is typically used to blend with styrene.

The reaction of the epoxidized ester resin with the ethylenically unsaturated monomer (c) can be conducted in the presence of a polymerization initiator at a temperature of 80 to 150° C. under an atmosphere of an inert gas, such as nitrogen gas and the like, until a desired acid value of the product may be obtained.

The polymerization initiator employed for the above reaction of the epoxidized ester resin with the ethylenically unsaturated monomer (c) can be one conventionally known in the art, such as peroxides, azo-compounds and the like. Typical example of the initiator is KAYABUTYL B (one of alkyl peresters), which is commercially available from KAY-AKU AKUZO. The initiator may be used in an amount of 0.1 to 20 part by weigh based on 100 parts by weight of the monomers employed in the reaction.

The acrylic modified epoxidized ester resin obtained from the reaction may preferably be obtained form an epoxy resin (a), a fatty acid (b) and an ethylenically unsaturated monomer (c) in a weight ratio of 20 to 70:20 to 50:3 to 50 based on 100 parts by weight of the resin, wherein the sum of the amounts of components (a), (b) and (c) is 100. If an amount of the epoxy resin (a) is less than 20 parts by weight, the corrosion resistance of the coating formed from the coating composition comprising the resin decreases. If an amount of the epoxy resin (a) is above 70 parts by weight, resin viscosity increases too much, and therefore, a desired acrylic group-modified epoxidized ester resin is not obtained. If an amount of the fatty acid (b) is less than 20 parts by weight, the water resistance property of the coating is poor. On the other hand, if an amount of the fatty acid (a) is above 50 parts by weight, an initial hardness of the coating formed from the coating composition decreases, and therefore, the handling characteristics of a substrate after is poor. Further, when an amount of the ethylenically unsaturated monomer (c) is less than 3 parts by weight, the dispensability of the obtained resin into water is poor. On the other hand, when an amount of the ethylenically unsaturated monomer (c) is above 50 parts by weight, the corrosion resistance of the coating deteriorates.

The acrylic group-modified ester resin preferably shows excellent water solubility (i.e. excellent hydrophilic property) to surely prevent the coating composition from separating out when it is collected as the coating solution, or when it is recycled. The water solubility can be shown as acid value. Thus, acid value of the preferable acrylic group-modified epoxidized ester resin used in the prevent invention may be within the range from 25 to 60, preferably within 30 to 50. When acid value of the resin is less than 25, the water solubility, that is, the a hydrophilic property of the water soluble resin, is poor, and therefore, it may separate during condensation. When the acid value is above 60, the water solubility of the resin is too high, and therefore, a water resistance of the coated film is poor.

The obtained acrylic group-modified epoxidized ester resin from the above reaction is perfectly neutralized with amines, such as ammonia, monomethylamine, dimethylamine, trimethylamine, monoethylamine, diethylamine, triethylamine, mono-n-propylamine, dimethyl-n-propylamine, monoethanolamine, dimethanolamine, triethanolamine, N-methyl ethanolamine, N-methyl diethanolamine, dimethyl ethanolamine, isopropanolamine, diisopropanolamine, etc., more preferably with triethylamine. Then, the neutralized resin is dispersed into a mixture of water and a hydrophilic solvent to obtain a water dispersion. The dispersion varnish typically has a non-volatile content of 60 to 100% by weight, but it is not limited thereto. The water soluble solvent used in the present invention may vapor out at the time of forming film. Examples thereof include glycol derivatives such as butyl cellosolve, butyl glycol, butyl diglycol and propylene glycol and the like.

The coating composition according to the present invention may contain the water dispersion in an amount of 50 to 90 part by weight based on 100 parts by weight of the whole composition, and may also contain of a mixture of water and a hydrophilic solvent, and the other additives such as pigment, drier and deforming agent and the like.

The pigment used in the coating composition can be colorant such as titanium carbonate, carbon black, quinacridone, etc., and filler such as barium sulfate, talc, clay, etc. The pigment may be formulated into the composition in an amount of 10 to 250 part by weight based on 100 parts by weight of the solid content of the resin.

Drier can be added into the aqueous coating composition of the present invention in order to cure by oxidation polymerization technique. Suitable drier used in the method according to the present invention is known in the art, such as lead, manganese and cobalt compound, for example, DICNATE 3111 (manufactured by DAINIPPON INK & CHEMICALS, INC.: cobalt containing compound).

By reference to FIG. 1, the method according to the present invention will be explained in detail.

In the step i) of the method according to the present invention, the cold curing aqueous coating composition may be spray coated on the surface of the substrate with a coating gun (2) in a coating booth (1). During coating, an excess of the coating composition can be collected by a coating curtain (3) of a collecting solution (4). Preferably, the components of the collecting solution (4) are the same as the hydrophilic solvent, especially butyl cellulose, which is contained in the cold curing aqueous coating composition in order to sufficiently disperse the coating composition into water. The solution part of the coating composition dispersed into the collecting solution is referred to as a diluted solution (6) which is sent to a concentrating tank (5).

In the method of the present invention, the collecting solution may be prepared of the following procedures. At first, the trapping water is prepared by mixing water and a hydrophilic solvent. Preferably, a content of the hydrophilic solvent in the collecting solution rages from 2.5 to 10% by weight. The hydrophilic solvent can be those which are described in the coating composition hereinbefore. Among them, butyl diglycol is more preferably.

Then, a pH of the collecting solution is adjusted with amines to between 8 and 10, preferably to 9.5. It is then condensed up to more than 30 seconds/#2 NK cup. The amines employed for adjusting the pH of the collecting solution can be those which is used for neutralizing the acrylic group-modified epoxidized ester resin. Dimethylethanolamine is more preferably employed in view of volatility. When the pH of the final collecting solution is adjusted to bellow 9.5, the solution is openly agitated to reduce pH to a certain value before concentration.

When the pH of the final collecting solution is less than 8, the concentrated coating solution collected with the collecting solution can not be concentrated to the desired value because of aggregation. On the other hand, when the pH of the final collecting solution is above 10, it is not desirable because hydrolysis may be facilitated during use and storage of the concentrated coating solution after collection, and therefore, an amount of the lower molecular components in the coating solution increases so that the viscosity of the coating composition to be recycled is too high.

The diluted solution (6) is subjected to the process for filtration and concentration to separate it into a concentrated coating solution and a filtrate. In the method of the present invention, the filtration and concentration process may be conducted with an apparatus of ultrafiltration (7).

The diluted solution (6) is passed through the apparatus of ultrafiltration (7) several times and concentrated until a coating viscosity is obtained, to form the concentrated coating composition. At the same time of filtration, water and solvents may be collected as the filtrate (9).

For using the concentrated coating solution after separation, as recycle use, it has to be confirmed that a size of coating particle is less than 30 μm, and a gloss retention to that of the original coating composition is above 90%. The size of coating particle can be determined by the conventional method known in the art.

For the concentrated coating solution, when the content of the hydrophilic solvent based on volatile content is above 20%, the content of the solvent in the coating composition to be recycled is too much, and therefore, it can not recycle in view of the Labor Safety Law or the restriction of the solvent.

In the step ii) of the method according to the present invention, the separated solution (9) can be recycled as a collecting solution after adjusting pH to the desirable value of between 8 to 10 with suitable amines. An object to adjust the pH of the separated solution is to supply an amount of the amine which is used for neutralization and which is vapored at the time of coating, and to prevent the change of the components ratio or to prevent the reduction of the pH of the coating composition. By achieving the object, the stability for hydration of the resin contained in the coating composition and the recycling property thereof are improved.

In the method of the present invention, after above step (ii), the concentration of the concentrated coating solution is readjusted to a desired value in the coating tank (10), and then recycled as the cold curing aqueous coating composition.

The present invention may provide the following two types of methods for recycling the coating composition as described hereinbefore:

① a method for recycling a recyclable cold curing aqueous coating composition, wherein the pH of both the collecting solution and the separated solution, and a content of a hydrophilic solvent contained in the collecting solution are determined, corresponding to acid value of the acrylic group-modified epoxidized ester resin used as a main binder of the coating composition; or ② a method for recycling a recyclable cold curing aqueous coating composition, wherein acid value of the acrylic group-modified epoxidized ester resin is determined corresponding to the pH of the collecting solution as well as the same of the separated solution, and a content of a hydrophilic solvent contained in the collecting solution.

The former method (①) is explained hereinbefore.

For the first embodiment related to the latter method (②), when the pH of the trap solution adjusts to 9.5, a recyclable cold curing aqueous coating composition is used which comprises the acrylic group-modified epoxidized ester resin of which acid value is optimized so as to satisfy the following equation:

$$AV \geq -12.00x + 63.5$$

wherein AV represents acid value and is a number of 25 to 60, and x represents an amount of the hydrophilic solvent contained in the trap solution and is the number of 1.5 to 20.

For the second embodiment related to the latter method (②), when the pH of the trap solution adjusts to 8.5, a recyclable cold curing aqueous coating composition is used which comprises the acrylic group-modified epoxidized ester resin of which acid value is optimized so as to satisfy the following equation:

$$AV \geq -3.22x + 61.5$$

wherein AV represents acid value and is a number of 25 to 60, and x represents an amount of the hydrophilic solvent contained in the trap solution and is the number of 1.5 to 20.

Further, for the third embodiment of the present invention, which is related to the latter method (②), when a content of the hydrophilic solvent contained in the trap solution is adjusted to 2.5 to 10% by weight, a recyclable cold curing aqueous coating composition is used which comprises the acrylic group-modified epoxidized ester resin of which acid value is optimized so as to satisfy the following equation:

$$AV \geq -1.88x - 20.62y + 230.34$$

wherein AV represents acid value and is the number of 25 to 60, and x represents an amount of the hydrophilic solvent contained in the trap solution and is the number of 2.5 to 10, and y represents the pH of the separated solution and satisfies the following equation:

$$8 \leq y \leq 10.$$

EXAMPLES

The following Examples, Comparative Examples and Production Examples further illustrate the present invention in detail but are not to be construed to limit the scope thereof. In the Examples, Comparative Examples and Production Examples, "part" is by weight unless otherwise stated.

Production Examples 1

609.2 Parts of EPIKOTE 1001 (bisphenol A epoxy resin, which is manufactured by SHELL CHEMICAL Co.), 295.4 parts of dehydrated castor fatty acid, 295.4 parts of safflower oil fatty acid and 24.0 parts of xylole for circulating, were charged into a reactor, and condensation-reacted for about 10 hours at a temperature of 210° C. under an atmosphere of a nitrogen gas with agitating until acid value of the product was 3.7. After finishing the reaction, 500 parts of butylcellosolve was added to dilute the reactant to obtain an epoxidized ester resin (Ep-1) having a nonvolatile content of 68.8 percent by weight and acid value of 3.7.

Production Examples 2

456.8 Parts of EPIKOTE 828 (bisphenol A epoxy resin, which is manufactured by SHELL CHEMICAL Co.), 366.3 parts of dehydrated castor fatty acid, 376.8 parts of tall oil fatty acid and 12.0 parts of xylole for circulating, were charged into a reactor, and condensation-reacted for about 10 hours at a temperature of 210 to 230° C. under an atmosphere of a nitrogen gas with agitating until acid value of the product was 3.4 to obtain an epoxidized ester resin (Ep-2) having a nonvolatile content of 99.0 percent by weight and acid value of 3.4.

Production Examples 3

727.7 Parts of EPIKOTE 1001 (bisphenol A epoxy resin, which is manufactured by SHELL CHEMICAL Co.), 232.8 parts of dehydrated castor fatty acid, 239.5 parts of tall oil fatty acid, 1.9 parts of tetra-n-butylammonium bromide and 12.0 parts of xylole for circulating, were charged into a reactor, and condensation-reacted for about 5 hours at a temperature of 200° C. under an atmosphere of a nitrogen gas with agitating until acid value of the product was 2.7. After finishing the reaction, an epoxidized ester resin (Ep-3) having a nonvolatile content of 99.0 percent by weight and acid value of 2.7 was obtained.

Production Examples 4

738. 2 Parts of EPOTOHT YD-012 (bisphenol A epoxy resin, which is manufactured by TOHTO KASEI Co., LTD.), 690.5 parts of linseed oil fatty acid, 1.4 parts of dibutyltin oxide and 42.0 parts of xylole for circulating, were charged into a reactor, and condensation-reacted for about 6 hours at a temperature of 210 to 240° C. under an atmosphere of a nitrogen gas with agitating until acid value of the product was 4.4. After that, 42 parts of butylcellosolve were added to dilute the reactant to obtain an epoxidized ester resin (Ep-4) having a nonvolatile content of 95.7 percent by weight and acid value of 4.4.

Production Examples 5

1008 Parts of the epoxidized ester resin Ep-1 and 153.6 parts of butylcellosolve were mixed in a reactor, and the mixture was heated to 140° C. At the temperature, 316.8 parts of styrene, 62.4 part of acrylic acid and 9.10 parts of an polymerization initiator (KAYABUTYL B, which is commercially available from KAYAKU AKUZO) were added dropwise to the mixture over 3 hours. After addition, the mixture was aged for 0.5 hours. After that, 2.27 parts of KAYABUTYL B as the polymerization initiator was added dropwise to the mixture and then aged for more 1.5 hours to obtain an acrylic group-modified epoxidized ester resin (a) having acid value of 46.4 and a nonvolatile content of 69.6 percent by weight.

Production Examples 6

An acrylic group-modified epoxidized ester resin (b) having acid value of 62.1 and a nonvolatile content of 70.0 percent by weight was obtained according to the same operation as that described in Production Example 5, except that 256.2 parts of the epoxidized ester resin Ep-1 and 4.4 parts of butylcellosolve, 4.0 parts of styrene, 15.6 part of acrylic acid and 0.72 parts and further 0.08 parts of an polymerization initiator (KAYABUTYL B, which is commercially available from KAYAKU AKUZO) were used.

Production Examples 7

203.4 Parts of the epoxidized ester resin Ep-2 and 24.3 parts of butylcellosolve were mixed in a reactor, and the mixture was heated to 140° C. At the temperature, 59.4 parts of styrene, 11.7 part of acrylic acid and 2.28 parts of an polymerization initiator (KAYABUTYL B, which is commercially available from KAYAKU AKUZO) were added dropwise to the mixture over 3 hours. After addition, the mixture was aged for 0.5 hours. After that, 0.57 parts of KAYABUTYL B as the polymerization initiator and 91.6 parts of butylcellosolve were added to the mixture and then aged for more 1.5 hours to obtain an acrylic group-modified epoxidized ester resin (c) having acid value of 30.5 and a nonvolatile content of 70 percent by weight.

Production Examples 8

An acrylic group-modified epoxidized ester resin (d) having acid value of 42.2 and a nonvolatile content of 70 percent by weight was obtained according to the same operation as that described in Production Example 5, except that 271.2 parts of the epoxidized ester resin Ep-3 and 121.4 parts of butylcellosolve, 4.0 parts of styrene, 15.6 part of acrylic acid and 1.44 parts and further 0.16 parts of an polymerization initiator (KAYABUTYL B, which is commercially available from KAYAKU AKUZO) were used.

Production Examples 9

244.0 Parts of the epoxidized ester resin Ep-4 and 72.5 parts of butylcellosolve were mixed in a reactor, and the mixture was heated to 130° C. At the temperature, 45.0 parts of styrene, 17.9 part of methyl methacrylate, 33.7 parts of 2-ethylhexyl methacrylate, 18.4 part of methacrylic acid and 1.15 parts of an initiator (KAYABUTYL B, which is commercially available from KAYAKU AKUZO) were added dropwise to the mixture over 3 hours. After addition, the mixture was aged for 1.0 hours. After that, 0.50 parts of KAYABUTYL B as the polymerization initiator and 67.0 parts of butylcellosolve were added dropwise to the mixture and then aged for more 2.5 hours to obtain an acrylic group-modified epoxidized ester resin (e) having acid value of 30.5 and a nonvolatile content of 70 percent by weight.

Production Examples 10

An acrylic group-modified epoxidized ester resin (f) having acid value of 21.6 and a nonvolatile content of 70 percent by weight was obtained according to the same operation as that described in Production Example 5 except that 1008 parts of the epoxidized ester resin Ep-1 and 153.6 parts of butylcellosolve, 352.7 parts of styrene, 26.5 part of acrylic acid and 9.10 parts and further 2.27 parts of an polymerization initiator (KAYABUTYL B, which is commercially available from KAYAKU AKUZO) were used.

Production Examples 11

An acrylic group-modified epoxidized ester resin (g) having acid value of 25.4 and a nonvolatile content of 70 percent by weight was obtained according to the same operation as that described in Production Example 5, except that 1008 parts of the epoxidized ester resin Ep-1 and 153.6 parts of butylcellosolve, 346.7 parts of styrene, 32.5 part of acrylic acid and 9.10 parts and further 2.27 parts of an initiator (KAYABUTYL B, which is commercially available from KAYAKU AKUZO) were used.

Production Examples 12

An acrylic group-modified epoxidized ester resin (h) having acid value of 54.3 and a nonvolatile content of 70 percent by weight was obtained according to the same operation as that described in Production Example 5 except that 1008 parts of the epoxidized ester resin Ep-1 and 153.6 parts of butylcellosolve, 305.4 parts of styrene, 73.8 part of acrylic acid and 9.10 parts and further 2.27 parts of an polymerization initiator (KAYABUTYL B, which is commercially available from KAYAKU AKUZO) were used.

Production Examples 13

An acrylic group-modified epoxidized ester resin (i) having acid value of 79.7 and a nonvolatile content of 70 percent by weight was obtained according to the same operation as that described in Production Example 5, except that 1008 parts of the epoxidized ester resin Ep-1 and 153.6 parts of butylcellosolve, 267.1 parts of styrene, 112.1 part of acrylic acid and 9.10 parts and further 2.27 parts of an polymerization initiator (KAYABUTYL B, which is commercially available from KAYAKU AKUZO) were used.

Table 1 shows each ratio by weight, acid value and nonvolatile content corresponding to acrylic group-modified epoxidized ester reins (a) to (i) obtained in Production Examples 5 to 13.

TABLE 1

| Acrylic group-modified epoxidized ester reins | Acid value | Nonvolatile content | Epoxidized ester reins | Components ratio by weight[+)] |
|---|---|---|---|---|
| a | 46.4 | 69.6 | Ep-1 | 1:1:1 |
| b | 62.1 | 70.0 | Ep-2 | 45:45:10 |
| c | 30.6 | 70.0 | Ep-3 | 30:44:26 |
| d | 42.2 | 70.0 | Ep-4 | 56:37:7 |
| e | 35.0 | 70.0 | Ep-1 | 1:1:1 |
| f | 21.6 | 70.0 | Ep-1 | 1:1:1 |

TABLE 1-continued

| Acrylic group-modified epoxidized ester reins | Acid value | Nonvolatile content | Epoxidized ester reins | Components ratio by weight[+) |
|---|---|---|---|---|
| g | 25.4 | 70.0 | Ep-1 | 1:1:1 |
| h | 54.3 | 70.0 | Ep-1 | 1:1:1 |
| i | 79.7 | 70.0 | Ep-1 | 1:1:1 |

[+)a ratio by weight of an epoxy resin (a)/a fatty acid (b)/an ethylenically-unsaturated monomer (c)

Example 1

The acid moiety of the acrylic group-modified epoxidized ester resin (a) was neutralized 100% with triethylamine. Then, the neutralized resin was dispersed into water to obtain a resinous varnish having a nonvolatile content of 35 percent by weight.

Sixty parts of the varnish, 0.1 parts of a deforming agent (silica—mineral oil deforming agent: NOBCO 8034L, which is manufactured by SUN NOBCO), 31.5 parts of colorant (titanium oxide: CR-95, which is manufactured by ISHIHARA SANGYO KAISHA, LTD.), 0.6 parts of a drier (cobalt containing compound: DICNATE 3111, which is manufactured by DAINIPPON INK & CHEMICALS, INC.) and 8.0 parts of water were mixed to produce a cold curing aqueous coating composition (A). A content of the hydrophilic solvent contained in the nonvolatile components of the composition (A) was about 19 percent by weight.

Examples 2 to 7

Cold curing aqueous coating compositions (C), (D), (E), (F), (G) and (H) were obtained according to the same operation as that described in Example 1 except that the acrylic group-modified epoxidized ester resin (c), (d), (e), (f), (g) and (h) were correspondingly used, respectively.

Comparative Examples 1 and 2

Cold curing aqueous coating compositions (B) and (I) were obtained according to the same operation as that described in Example 1 except that the acrylic group-modified epoxidized ester resin (b) and (i) were correspondingly used, respectively.

EVALUATION ITEMS

(I) Recycling Property of the Cold Curing Aqueous Coating Compositions

The cold curing aqueous coating composition (A) prepared in Example 1 was diluted to a nonvolatile content of 5 percent by weight with a collecting solution which was previously prepared from water and butyl diglycol in a weight ratio of 100/0 to 80/20 to obtain a diluted coating solution. A pH of the diluted coating solution was adjusted to 9.5. After that, the diluted coating solution was subjected to ultrafiltration to concentrate up to the concentration of more than 30 seconds/#2 NK cup to obtain a concentrated coating solution (A'). Ultrafiltration was conducted by using UF module system (manufactured by ASAHI CHEMICAL INDUSTRY Co., LTD.) provided with a solution carrying pump in order to circulate and concentrate the diluted coating solution.

For the cold curing aqueous coating compositions (C) to (H) prepared in Examples 2 to 7, and the cold curing aqueous coating compositions (B) and (I) obtained from Comparative Examples 1 and 2, the corresponding concentrated coating solutions (C') to (H') and (B') and (I') was prepared according to the same procedure as described above.

Each size of coating particles contained in the above concentrated coating solutions and the appearances of the coating films formed form them were evaluated by the following procedures. Both the size of coating particles and the appearance of the coating films are referred to as recycling properties.

1. The Size of Coating Particles

Each size of coating particles for the initial and the concentrated cold curing coating compositions was measured according to Standard Method of JIS K-5400.

Each size of the coating particle for the initial coating compositions was less than 15 μm. The size of the coating particles was evaluated according to the following criteria.

| Criteria: |
|---|
| ○: less than 30 μm |
| X: above 30 μm |

2. The Appearances of the Coating Films (i) Gloss

The gloss of the coating films was determined according to the following procedures. Each of the initial and the concentrated cold curing coating compositions were coated onto the surface of glass plates with a doctor blade of 6 miL and then dried for 20 minuets at 80° C. For the obtained coating film, gloss at the degree of 60 was measured and compared with the initial cold curing coating compositions each other. A proportion of stability of Gloss was evaluated according to the following criteria based on 100 percent of gloss of the initial coating.

| Criteria |
|---|
| ○: more than 90 percent compared with the value of the initial coating |
| X: less than 90 percent compared with the value of the initial coating |

(ii) Salt spray resistance (JIS K-5400-9)

The concentrated coating compositions obtained as described above were spray coated onto a dall steel plate is a thickness of 25 to 30 μm, and dried for 20 minuets at 80° C., followed by leaving it for a week at ambient temperature. Thereafter, the coated plate was subjected to a test for salt spray resistance according to Standard Method of JIS K-5400-9 for 96 hours. The salt spray resistance was determined by measuring the stripped width (mm) of the coating from the coated plate. The resistance was evaluated according to the following criteria.

| Criteria |
|---|
| ○: stripped width within 3 mm |
| X: stripped width above 3 mm |

(iii) Resistance to hot water (JIS K-5400-8)

A dall steel plate having the coating formed from the concentrated coating solution was immersed into hot water at a temperature of 40° C. for 10 days. It was then evluated whether blisters were present or not according to the following criteria.

| Criteria |
| --- |
| ○: a blister was not occurred. |
| X: some blisters was occurred. |

The results from the above evaluations are shown in Table 2.

TABLE 2

| Coating composition | Acrylic group-modified epoxidized ester reins used for the evaluation | Acid value | Size of coating particle (μm) | Appearance of coating film | | |
| --- | --- | --- | --- | --- | --- | --- |
| | | | | (i) Gloss (%) | (ii) Salt spray resistance | (iii) Resistance to hot water |
| A | a | 46.4 | <15 | 100 | ○ | ○ |
| B | b | 62.1 | <15 | 98 | X | 8D |
| C | c | 30.6 | 20 | 92 | ○ | ○ |
| D | d | 42.2 | 20 | 98 | ○ | ○ |
| E | e | 35.0 | 20 | 96 | ○ | ○ |
| F | f | 21.6 | >50 | 58 | ○ | ○ |
| G | g | 25.4 | 25 | 92 | ○ | ○ |
| H | h | 54.3 | <15 | 98 | ○ | ○ |
| I | i | 79.7 | <15 | 100 | X | 6D |

In Table 2, the results show that when the cold curing aqueous coating composition having acid value of 25 to 60 is used, the recycling property of the coating composition collected as described above may be remarkably improved by optimizing a content of the solvent contained in the collecting solution and pH thereof.

(II) The Relationship of a Certain Value of the pH of the Collecting Solution with Acid Value of the Resin for the Coating Composition and a Content of the Hydrophilic Solvent Contained in the Collecting Solution The preferred acid value of the resin for the coating composition, and the preferred content of the hydrophilic solvent contained in the collecting solution were studied with fixing the pH of the collecting solution to a certain value.

Two collecting solutions having the same formulations were prepared and their pH values were adjusted to 9.5 and 8.5 with dimethylethanolamine. Each nonvolatile content of the initial collecting solutions before concentration was adjusted to 5 percent by weight. The collecting solutions were divided into six parts.

To each part of the divided collecting solutions, butyl diglycol as a hydrophilic solvent was added in an amount of 0, 1.5, 2.5, 5, 10 and 20 part by weight based on 100 parts by weight of the whole collecting solution to obtain different twelve parts (i.e. the pH of six parts of 9.5 and the another six parts of 8.5).

Figure 2:
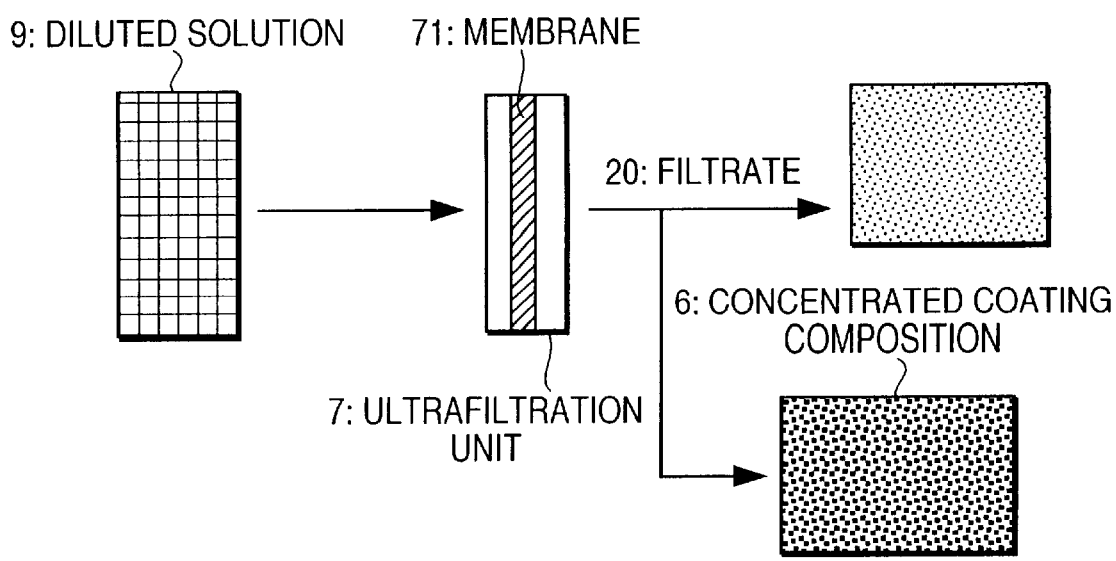
FIG. 2 shows a schematic flow chart of the recycling system of the invention.

The recycling system for the coating composition according to the present invention is shown in FIG. 1. On the system, the coating composition (A) to (I) prepared in Examples and Comparative Examples were recycled by collecting with any one of these twelve parts of the collecting solutions, filtering and concentrating, successively. Consequently, the recycling properties (i.e. the size of the coating particles and/or the change of a proportion of gloss stability of the coating films formed from the coating compositions after recycled corresponding to the same of the fresh coating compositions) were evaluated according to the same way as described above (I). For the recycling properties, if the coating film had less than 30 μm of the size of the coating particles and above 90% of a proportion of the gloss stability, it was determined good (○), and otherwise poor (x).

The results for the evaluation are shown in Tables 3 and 4.

TABLE 3 i) The pH of the collecting solution of 9.5

| Coating composition | Acid value of the resin | A content of the hydrophilic solvent in the collecting solution (% by weight) | | | | | |
| --- | --- | --- | --- | --- | --- | --- | --- |
| | | 0 | 1.5 | 2.5 | 5 | 10 | 20 |
| F | 21.6 | X | — | — | — | — | X |
| G | 25.4 | X | X | X | ○ | ○ | ○ |
| C | 30.6 | X | X | ○ | ○ | ○ | ○ |
| E | 35.0 | X | X | ○ | ○ | ○ | ○ |
| D | 42.2 | X | X | ○ | ○ | ○ | ○ |
| A | 46.4 | X | X | ○ | ○ | ○ | ○ |
| H | 54.3 | X | X | ○ | ○ | ○ | ○ |
| B | 62.1 | ○ | ○ | ○ | ○ | ○ | ○ |
| I | 79.7 | ○ | ○ | ○ | ○ | ○ | ○ |

TABLE 4 ii) The pH of the collecting solution of 8.5

| Coating composition | Acid value of the resin | A content of the hydrophilic solvent in the collecting solution (% by weight) | | | | | |
| --- | --- | --- | --- | --- | --- | --- | --- |
| | | 0 | 1.5 | 2.5 | 5 | 10 | 20 |
| F | 21.6 | X | — | — | — | — | X |
| G | 25.4 | X | X | X | X | X | ○ |
| C | 39.6 | X | X | X | X | ○ | ○ |
| E | 35.0 | X | X | X | X | ○ | ○ |
| D | 42.2 | X | X | X | X | ○ | ○ |
| A | 46.4 | X | X | ○ | ○ | ○ | ○ |
| H | 54.3 | X | X | ○ | ○ | ○ | ○ |
| B | 62.1 | ○ | ○ | ○ | ○ | ○ | ○ |
| I | 79.7 | ○ | ○ | ○ | ○ | ○ | ○ |

In Tables 3 and 4, the results show that when the pH of the collecting solution is constant, the higher the acid value of the acrylic group-modified epoxidized ester resin is, and/or the more the content of the hydrophilic solvent in the collecting solution is, the better the properties thereof are. The results also show that when the pH of the collecting solution is reduced from 9.5 to 8.5, it is required the minimum value of the hydrophilic solvent content in the collecting solution increases from 1.5 up to 2.5% by weight.

It is considered from the above results that when the pH of the collecting solution adjusts to 9.5, acid value of the acrylic group-modified epoxidized ester resin should satisfy the following equation:

$$AV \geq -12.00x + 63.5$$

wherein AV represents acid value and is the number of 25 to 60, and x represents an amount of the hydrophilic solvent contained in the collecting solution and is a number of 1.5 to 20.

Alternately, it is considered that when the pH of the collecting solution adjusts to 8.5, acid value of the acrylic group-modified epoxidized ester resin should satisfy the following equation:

$$AV \geq -3.22x + 61.5$$

wherein AV represents acid value and is the number of 25 to 60, and x represents an amount of the hydrophilic solvent contained in the collecting solution and is a number of 1.5 to 20.

(III) The Relationship of a Content of the Hydrophilic Solvent Contained in the Collecting Solution with Acid Value of the Resin for the Coating Composition and the pH of the Collecting Solution, The preferable acid value of the resin for coating composition or the preferable value of the pH of the collecting solution was further studied when a content of the hydrophilic solvent contained in the collecting solution was constant.

Three collecting solutions having the same formulations were prepared by adding butyl diglycol as a hydrophilic solvent in an amount of 2.5, 5 and 10 part by weight to the collecting. Then, each nonvolatile content of the initial collecting solutions before concentration was adjusted to 5 percent by weight.

Another two of the collecting solutions, in which a content of butyl diglycol was 2.5 parts by weight, were divided into five parts, and their pH value were adjusted to 8.0, 8.5, 9.0, 9.5 and 10.0 with dimethylethanolamine.

The another collecting solutions, in which each content of butyl diglycol was 5 and 10 parts by weight, were divided into five parts and then adjusted the pH of each parts according to the same way 8.0, 8.5, 9.0, 9.5 and 10.0 with dimethylethanolamine. Thus, all of fifteen parts of the collecting solutions were obtained.

On the recycling system according to the present invention shown in FIG. 1, the coating compositions (A) to (I) prepared in Examples and Comparative Examples were recycled by collecting with any one of these fifteen parts of the collecting solutions, filtering and concentrating, successively. Consequently, the recycling properties (i.e. the size of the coating particles and/or the change of a proportion of gloss stability of the coating films formed from the coating compositions after recycled corresponding to the same of the fresh coating compositions) were evaluated according to the same way as described above (I). For the recycling properties, if the coating film had less than 30 μm of the size of the coating particles and above 90% of a proportion of the gloss stability, it was determined good (○), and otherwise poor (x).

The results for the evaluation are shown in Tables 5, 6 and 7.

TABLE 5 iii) A content of the hydrophilic solvent of the collecting solution of 2.5% by weight

| Coating composition | Acid value of the resin | The pH of the collecting solution | | | | |
|---|---|---|---|---|---|---|
| | | 8.0 | 8.5 | 9.0 | 9.5 | 10.0 |
| F | 21.6 | — | — | — | X | X |
| G | 25.4 | X | X | X | X | X |
| C | 30.6 | X | X | X | ○ | ○ |
| E | 35.0 | X | X | X | ○ | ○ |
| D | 42.2 | X | X | ○ | ○ | ○ |
| A | 46.4 | X | ○ | ○ | ○ | ○ |
| H | 54.3 | X | ○ | ○ | ○ | ○ |
| B | 62.1 | ○ | ○ | ○ | ○ | ○ |
| I | 79.7 | ○ | ○ | ○ | ○ | ○ |

TABLE 6 iv) A content of the hydrophilic solvent of the collecting solution of 5% by weight

| Coating composition | Acid value of the resin | The pH of the collecting solution | | | | |
|---|---|---|---|---|---|---|
| | | 8.0 | 8.5 | 9.0 | 9.5 | 10.0 |
| F | 21.6 | — | — | — | X | X |
| G | 25.4 | X | X | X | ○ | ○ |
| C | 30.6 | X | X | X | ○ | ○ |
| E | 35.0 | X | X | ○ | ○ | ○ |
| D | 42.2 | X | X | ○ | ○ | ○ |
| A | 46.4 | X | ○ | ○ | ○ | ○ |
| H | 54.3 | X | ○ | ○ | ○ | ○ |
| B | 62.1 | ○ | ○ | ○ | ○ | ○ |
| I | 79.7 | ○ | ○ | ○ | ○ | ○ |

TABLE 7 v) A content of the hydrophilic solvent of the collecting solution of 10 % by weight

| Coating composition | Acid value of the resin | The pH of the collecting solution | | | | |
|---|---|---|---|---|---|---|
| | | 8.0 | 8.5 | 9.0 | 9.5 | 10.0 |
| F | 21.6 | — | — | — | X | X |
| G | 25.4 | X | X | ○ | ○ | ○ |
| C | 30.6 | X | ○ | ○ | ○ | ○ |
| E | 35.0 | X | ○ | ○ | ○ | ○ |
| D | 42.2 | X | ○ | ○ | ○ | ○ |
| A | 46.4 | X | ○ | ○ | ○ | ○ |
| H | 54.3 | ○ | ○ | ○ | ○ | ○ |
| B | 62.1 | ○ | ○ | ○ | ○ | ○ |
| I | 79.7 | ○ | ○ | ○ | ○ | ○ |

In Tables 5, 6 and 7, the results shows that when a content of the hydrophilic solvent in the collecting solution is fixed to a certain value, the higher acid value of the acrylic group-modified epoxidized ester resin is, and/or the higher the pH of the collecting solution is, the better the properties thereof are. The results also shows that the preferable value of the pH of the collecting solution and an acid vale of the resin increase with increasing a content of the hydrophilic solvent in the collecting solution.

It is considered from the above results that when the an amount of the hydrophilic solvent contained in the collecting solution is adjusted to 2.5 to 10% by weight, acid value of the acrylic group-modified epoxidized ester resin should satisfy the following equation:

$$AV \geq -1.88x - 20.62y + 230.34$$

wherein AV represents acid value and is the number of 25 to 60, and x represents an amount of the hydrophilic solvent contained the collecting solution and is the number of 2.5 to 10, and y presents the pH of the filtrate and satisfies $8 \leq y \leq 10$.

What is claimed is:

1. A method for recycling a recyclable cold curing aqueous coating composition, which comprises the following steps:
   i) collecting the recyclable cold curing aqueous coating composition after applying in a coating booth, using a collecting solution having a pH of 8 to 10, wherein the recyclable cold curing aqueous coating composition comprises an acrylic group-modified epoxidized ester resin with an acid value of 25 to 60, which is formed from an epoxy resin (a), a fatty acid (b) and an ethylenically unsaturated monomer (c) in a component (a)/component (b)/component (c) weight % ratio of 20 to 70/20 to 50/3 to 50, the sum of (a), (b) and (c) being 100 weight %,
   ii) filtering the collected coating composition to separate the composition into a concentrated coating composition and a filtrate,
   iii) adjusting a concentration of a hydrophilic solvent in the filtrate to 1.5 to 20% by weight and a pH of the filtrate to between 8 and 10, and
   iv) using the adjusted filtrate as the collecting solution.

2. The method according to claim 1, wherein the filtering of the step (ii) is conducted by ultrafiltration.

3. The method according to claim 1, wherein the collecting solution is composed of a mixture of water and a hydrophilic solvent.

4. The method according to claim 1, wherein both of a ratio by weight of each component contained in a concentrated coating solution and a ratio by weight of each component contained in the filtrate are identical with a ratio by weight of each component contained in the collecting solution.

5. The method according to claim 1, wherein when the pH of the collecting solution is adjusted to 9.5, the acrylic group-modified epoxidized ester resin is selected such that the acid value of said resin satisfies the following equation:

$$AV \geq -12.00x + 63.5$$

wherein AV represents the acid value of the resin and is a number within the range of 25 to 60, and x represents an amount in weight of the hydrophilic solvent contained in the collecting solution and is a number within the range of 1.5 to 20.

6. The method according to claim 1, wherein when the pH of the collecting solution is adjusted to 8.5, the acrylic group-modified epoxidized ester resin is selected such that the acid value of said resin satisfies the following equation:

$$AV \geq -3.22x + 61.5$$

wherein AV represents the acid value of the resin and is a number within the range of 25 to 60, and x represents an amount in weight of the hydrophilic solvent contained in the collecting solution and is a number within the range of 1.5 to 20.

7. The method according to claim 1, wherein the acrylic group-modified epoxidized ester resin is selected such that when an amount of the hydrophilic solvent contained in the collecting solution is adjusted to 2.5 to 10% by weight, the resin satisfies the following equation:

$$AV \geq -1.88x - 20.62y + 230.34$$

wherein AV represents acid value of the resin and is a number within the range of 25 to 60, and x represents an amount of the hydrophilic solvent contained in the collecting solution and is a number within the range of 2.5 to 10, and y represents a pH of the filtrate and satisfies $8 \leq y \leq 10$.

* * * * *